US012767879B1

(12) United States Patent
Li et al.

(10) Patent No.: US 12,767,879 B1
(45) Date of Patent: Oct. 20, 2026

(54) HYPERBRANCHED CROSSLINKER, AND HYDRAULIC FRACTURING FLUID INCLUDING SAME

(71) Applicant: SAUDI ARABIAN OIL COMPANY, Dhahran (SA)

(72) Inventors: Wengang Li, Dhahran (SA); Abdullah S. Garni, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/309,215

(22) Filed: Aug. 25, 2025

(51) Int. Cl.
*C09K 8/68* (2006.01)
*C09K 8/72* (2006.01)

(52) U.S. Cl.
CPC .............. *C09K 8/685* (2013.01); *C09K 8/725* (2013.01)

(58) Field of Classification Search
CPC ... C09K 8/62; C09K 8/66; C09K 8/68; C09K 8/685; C09K 8/725; C09K 2208/12; C09K 2208/28; E21B 43/27; E21B 43/267; C08G 83/005; C08G 83/006; C08G 83/002; C08G 83/00; C07F 7/081; C07C 57/34; C08L 101/005
See application file for complete search history.

(56) References Cited

U.S. PATENT DOCUMENTS

| | | | | |
|---|---|---|---|---|
| 7,958,424 B2 * | 6/2011 | Kons | H03M 13/6561 714/752 |
| 9,062,242 B2 | 6/2015 | Jiang et al. | |
| 10,113,100 B1 | 10/2018 | Hilfiger et al. | |
| 10,160,902 B2 | 12/2018 | Reddy et al. | |
| 10,400,160 B2 | 9/2019 | Maxey et al. | |
| 11,268,016 B2 | 3/2022 | Al-Muntasheri et al. | |
| 11,339,322 B2 | 5/2022 | Li et al. | |
| 11,760,922 B2 | 9/2023 | Li et al. | |
| 11,814,580 B1 * | 11/2023 | Li | E21B 43/267 |
| 12,065,614 B1 | 8/2024 | Li et al. | |

FOREIGN PATENT DOCUMENTS

CN 105481282 A * 4/2016

OTHER PUBLICATIONS

Translation of CN-105481282-A (Year: 2016).*

(Continued)

*Primary Examiner* — Angela M DiTrani Leff
(74) *Attorney, Agent, or Firm* — Osha Bergman Watanabe & Burton LLP

(57) ABSTRACT

A hyperbranched crosslinker includes a base polymer including a hyperbranched polyethyleneimine, at least one oxiranylalkanol branch including at least one oxiranylalkanol monomer unit derived from oxiranylalkanol and bonded to the base polymer, and at least one amide-containing branch including a monomer unit derived from an acid anhydride and bonded to the base polymer. A method for producing a hyperbranched crosslinker includes reacting a base polymer including hyperbranched polyethyleneimine with an acid anhydride to produce an acid anhydride-modified base polymer including the base polymer and at least one amide-containing branch, and reacting the acid anhydride-modified base polymer with oxiranylalkanol to produce the hyperbranched crosslinker.

20 Claims, 4 Drawing Sheets

(56) References Cited

OTHER PUBLICATIONS

Khan, M., "Chemical and Physical Architecture of Macromolecular Gels for Fracturing Fluid Applications in the Oil and Gas Industry; Current Status, Challenges, and Prospects," Gels, vol. 10, No. 338, pp. 1-46, May 16, 2024 (46 pages).

Al-Muntasheri, G.A. et al., "IPTC 11080: Evaluation of a New Cost-Effective Organic Gel System for High Temperature Water Control," IPTC, pp. 1-12, Dec. 4-6, 2007 (12 pages).

Reddy, B.R. et al., "Natural Polymer-Based Compositions Designed for Use in Conformance Gel Systems," SPE Journal, SPE 84510, pp. 385-393, Dec. 2005 (9 pages).

* cited by examiner

HYPERBRANCHED CROSSLINKER, AND HYDRAULIC FRACTURING FLUID INCLUDING SAME

BACKGROUND

Hydraulic fracturing ("fracking") is a commonly employed well stimulation technique used to enhance the production of oil and gas from low-permeability reservoirs such as shale, tight sandstone, and coal beds. In fracking, a hydraulic fracturing fluid ("fracking fluid") is injected into a target formation through a wellbore at a high pressure to break the rock and propagate fractures in order to encourage the flow of hydrocarbons from the formation to the wellbore.

A fracking fluid typically includes water, proppant and chemical additives. The Fracking fluid may additionally include a crosslinker to increase the viscosity of the fracking fluid, which may improve the ability of the fracking fluid to suspend the proppants and reduce the amount of fracking fluid loss. Crosslinkers used in fracking fluid compositions may include a metal cation such as $Fe^{3+}$, $Zr^{4+}$, $Ti^{4+}$, a borate anion, or a polymer. However, crosslinked compositions formed by such crosslinkers may remain in the formation as residues, the presence of which may damage the formation. Accordingly, there exists a need for an improved crosslinker which is capable of forming a degradable crosslinked composition to minimize the residue buildup in the formation as a result of the fracking operation, and to reduce or eliminate the formation damage caused by such residues.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a hyperbranched crosslinker including a base polymer including a hyperbranched polyethyleneimine, at least one oxiranylalkanol branch including at least one oxiranylalkanol monomer unit derived from oxiranylalkanol and bonded to the base polymer, and at least one amide-containing branch including a monomer unit derived from an acid anhydride and bonded to the base polymer.

In another aspect, embodiments disclosed herein relate to a method for producing a hyperbranched crosslinker. The method includes reacting a base polymer including hyperbranched polyethyleneimine with an acid anhydride to produce an acid anhydride-modified base polymer including the base polymer and at least one amide-containing branch, and reacting the acid anhydride-modified base polymer with oxiranylalkanol to produce the hyperbranched crosslinker. The oxiranylalkanol branch included in the hyperbranched crosslinker includes at least one oxiranylalkanol monomer unit derived from oxiranylalkanol and bonded to the base polymer, and the amide-containing branch included in the hyperbranched crosslinker includes a monomer unit derived from the acid anhydride and bonded to the base polymer.

Other aspects and advantages of the claimed subject matter will be apparent from the following description and the appended claims.

DETAILED DESCRIPTION

Hyperbranched Crosslinker

In one aspect, embodiments enclosed herein relate to a hyperbranched crosslinker. The hyperbranched crosslinker includes a base polymer including a hyperbranched polyethyleneimine, at least one oxiranylalkanol branch including at least one oxiranylalkanol monomer unit derived from oxiranylalkanol and bonded to the base polymer, and at least one amide-containing branch including a monomer unit derived from an acid anhydride and bonded to the base polymer.

Figure 1:
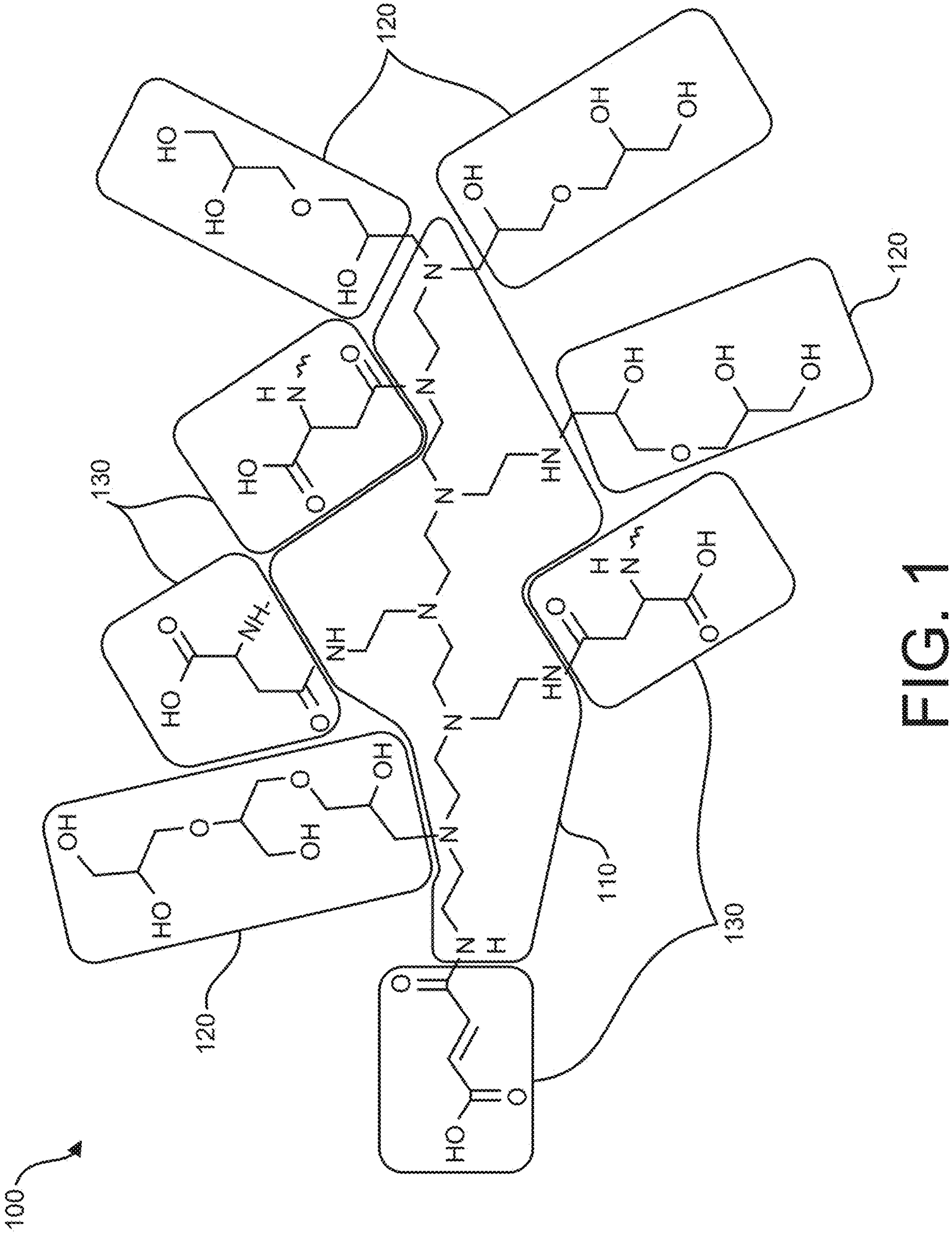
FIG. 1 is a schematic diagram of an exemplary hyperbranched crosslinker according to one or more embodiments.

FIG. 1 is a schematic diagram of an exemplary hyperbranched crosslinker according to one or more embodiments. The scope of the hyperbranched crosslinker in one or more embodiments is not limited to the hyperbranched crosslinker of FIG. 1.

The hyperbranched crosslinker 100 includes a base polymer 110 including a hyperbranched polyethyleneimine, a plurality of oxiranylalkanol branches 120 and a plurality of amide-containing branches 130 bonded to the base polymer 110. The plurality of oxiranylalkanol branches 120 is bonded to the nitrogen atoms of the base polymer 110 to form either a secondary or a tertiary amine bond. The oxiranylalkanol branch 120 includes a plurality of monomer units derived from glycidol which are bonded with each other to form polyglycidol. The plurality of amide-containing branches 130 are bonded to the nitrogen atoms of the base polymer 110 to form either a secondary or a tertiary amine bond. The amide-containing branch 130 includes a monomer unit derived from maleic anhydride. Maleic anhydride undergoes a ring-opening reaction and the C═O group bonds with the nitrogen atom of the base polymer 110 to form an amide group represented by —C(═O)—(N). A molecule of the hyperbranched crosslinker 100 which includes a single base polymer molecule, a plurality of oxiranylalkanol branches 120 and a plurality of amide-containing branched 130 is defined as a "hyperbranched crosslinker molecular unit" or "hyperbranched crosslinker unit."

Hyperbranched polymers, such as hyperbranched polyethyleneimine, belong to a structural class known as dendritic polymers, distinguished from other polymer types such as linear, branched or crosslinked. Within the class of dendritic polymers, hyperbranched polymers may be distinguished from dendrimers.

Dendrimers are generally regarded as polymeric molecules composed of multiple perfectly-branched monomers radially emanating from a central core. The number of branch points increases upon moving from the dendrimer core to its surface and defines dendrimer generation. Dendrimers are characterized by a highly regular three-dimensional structure and very high homogeneity, with polydispersity indices approaching 1.0. Typically, dendrimers may be functionalized only at terminal groups. In contrast to dendrimers, hyperbranched polymers are densely branched, because any repeat unit of the polymer may be capable of serving as a branch point.

Owing to this aspect, hyperbranched polymers have an irregular three-dimensional structure. While dendrimers typically have well defined structures and nearly monodisperse molecular weights, hyperbranched polymers typically are composed of a mixture of linear and branched units inside, with multifunctional groups on their periphery. Thus, hyperbranched polymers have more irregular structures with polydispersity of molecular weight than dendrimers. Typical hyperbranched polymers have polydispersities of at least 1.1.

Hyperbranched polymers may be characterized according to the properties of polymers which may include, but are not limited to, weight-average molecular weight ($M_w$), number-average molecular weight ($M_n$), polydispersity ($M_w/M_n$), and density. Hyperbranched polymers further may be characterized with respect to the degree of branching and branching generations.

Degree of branching refers to the number of monomers of a hyperbranched polymer that are branch units, as a fraction of the total number of monomers in the hyperbranched polymer. Typical hyperbranched polymers exhibit degrees of branching from 0.1 to 0.9, or 0.2 to 0.8, or 0.3 to 0.7, or 0.4 to 0.6.

Generations of branching (branching generation) describe the extent to which the hyperbranched polymer is branched from a main chain of the polymer. For example, a hyperbranched polyethyleneimine may have a polyethyleneimine main chain that can be traced from a starting ethyleneimine monomer to a terminal ethyleneimine monomer. Linear polyethyleneimine has, by definition, zero generations of branching. Branching of polyethyleneimine (PEI branching) may be accomplished by replacing a hydrogen atom on the nitrogen atom of an ethyl eneimine monomer with a "branch" of polyethyleneimine. If all of such branches are themselves linear, then the main polymer has only one generation of PEI branching. Yet, if at least a portion of such branches themselves have polyethyleneimine branches, then the main polymer has at least two generations of PEI branching. For the hyperbranched polymer to be considered to have two generations of PEI branching, it is not necessary for every branch of the first generation of branches to itself have a second generation. Rather, the hyperbranched polymer is considered to have two generations of PEI branching whenever at least one first-generation branch of the main polymer includes at least one second-generation branch. Likewise, the hyperbranched polymer is considered to have three generations of PEI branching whenever at least one second-generation branch of the main polymer includes at least one third-generation branch.

Base Polymer

In one or more embodiments, the hyperbranched cross-linker includes a base polymer including a hyperbranched polyethyleneimine (PEI).

In one or more embodiments, the hyperbranched polyethyleneimine includes polymers according to formula (Ia):

(Ia)

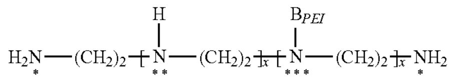

The structure of formula (Ia) represents the main chain of the hyperbranched polyethyleneimine. In formula (Ia), the nitrogen atoms are labeled with asterisks to illustrate the presence of primary amines (*), secondary amines (), and tertiary amines (*). The primary amines are present on terminal monomers of the main chain of the hyperbranched polyethyleneimine. The secondary amines are present on unbranched, linear monomers of the main chain of the hyperbranched polyethyleneimine. The tertiary amines are present on monomers that are branch points of the hyperbranched polyethyleneimine. Subscripts x and y represent molar fractions of monomers present in the main chain, where x is from 0 to 0.9, y is from 0.1 to 1, and the sum of x and y is 1. The hyperbranched polyethyleneimine of formula (Ia) may have a weight-average molecular weight from 0.5 kDa to 1000 kDa.

The group $B_{PEI}$ bonded to the tertiary amine in the main chain of the hyperbranched polyethyleneimine is a polyethyleneimine branch of formula (IIa):

(IIa)

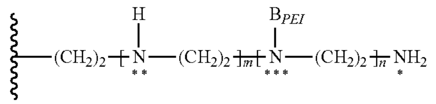

The structure of formula (IIa) represents a branch of the hyperbranched polyethyleneimine. In formula (IIa), the nitrogen atoms are labeled with asterisks to illustrate the presence of a primary amine (*), secondary amines (), and tertiary amines (*). The primary amine is present on a terminal monomer of the main chain of the hyperbranched polyethyleneimine. The secondary amines are present on unbranched, linear monomers of the branch of the hyperbranched polyethyleneimine. The tertiary amines are present on monomers that are further branch points of the hyperbranched polyethyleneimine. Subscripts m and n represent molar fractions of monomers present in the branch, where m is from 0 to 1, n is from 0 to 1, and the sum of m and n is 1. The group $B_{PEI}$ bonded to the tertiary amine is a further polyethyleneimine branch of formula (IIa).

A polyethyleneimine branch bonded directly to the main chain of the hyperbranched polyethyleneimine represents a first generation of PEI branching (branching generation of 1), a polyethyleneimine branch bonded to a first-generation branch represents a second generation of PEI branching (branching generation of 2), a polyethyleneimine branch bonded to a second-generation branch represents a third generation of PEI branching (branching generation of 3), and so forth. In one or more embodiments, the base polymer has a branching generation in a range of from about 1 to 20, such as in a range of from a lower limit of 1 to an upper limit selected from any one of 2, 3, 4, 5, 10 and 20, where the lower limit may be paired with any upper limit. In the final generation of PEI branching, subscript n of the polyethyleneimine branch is zero.

In one or more embodiments, the total number of primary amines in the hyperbranched polyethyleneimine, the total number of secondary amines in the hyperbranched polyethyleneimine, and the total number of tertiary amines in the hyperbranched polyethyleneimine are approximately equal to each other or may be within plus-or-minus 5%, 10%, 15%, or 20% of each other. The total number of amines of any kind in the hyperbranched polyethyleneimine include those in the main chain of formula (Ia), and also those in all PEI branches of formula (IIa).

In one or more embodiments, the base polymer has a weight-average molecular weight (Mw) in a range of from about 0.5 kDa to 1000 kDa, such as in a range of from a lower limit selected from any one of 0.5, 0.8, 1, 10 and 25 kDa to an upper limit selected from any one of 500, and 1000 kDa, where any lower limit may be paired with any upper limit.

The hyperbranched polyethyleneimine may be produced, for example, by reacting polyethyleneimine with an amine, such as triethylamine. The reaction of polyethyleneimine with an amine may be conducted, for example in a solvent such as water and N-methyl-2-pyrrolidone.

Oxiranylalkanol Branch

In one or more embodiments, the hyperbranched crosslinker includes at least one oxiranylalkanol branch bonded to the base polymer. The oxiranylalkanol branch includes at least one oxiranylalkanol monomer unit derived from oxiranylalkanol.

In one or more embodiments, oxiranylalkanol includes a compound expressed in formula (Ib):

(Ib)

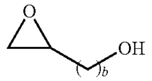

In formula (Ib), subscript b, represents a length of an alkylene chain of —$(CH_2)$— units. The subscript b may be an integer in a range of from 1 to 10, such as in a range of from a lower limit of 1 to an upper limit selected from any one of 2, 3, 4, 5, 6, and 10, where the lower limit may be paired with any of the upper limit. In one or more embodiments, b may be 1. When subscript b equals 1, the oxiranylalkanol is oxiranylmethanol (glycidol). When subscript b equals 2, the oxiranylalkanol is oxiranylethanol. When subscript b equals 3, the oxiranylalkanol is oxiranylpropanol. When subscript b equals 4, the oxiranylalkanol is oxiranylbutanol. When subscript b equals 5, the oxiranylalkanol is oxiranylpentanol.

In one or more embodiments, oxiranylalkanol is polymerized by multiple methods distinguished by how the next oxiranylalkanol molecule attacks the reactive point of the propagating polyoxiranylalkanol polymer chain. Depending on the polymerization method used, a polyoxiranylalkanol prepared from an oxiranylalkanol compound according to formula (Ib) may have a general structure according to formula (IIIa) or formula (IVa):

(IIa)

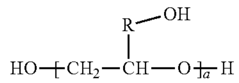

(IVa)

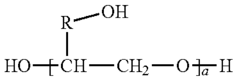

In formula (IIIa) and formula (IVa), each R is —$(CH_2)_b$—, where b is as defined in formula (Ib). Subscript a represents a number of monomer units. The subscript a may be in a range of from about 1 to about 1000, such as in a range of from a lower limit of 1 to an upper limit selected from any one of 2, 3, 4, 5, 10, 20, 50, 100, 200, 300, 400, 500, and 1000, where the lower limit may be paired with any of the upper limit. The subscript a may be 1.

In one or more embodiments, the groups —R—OH of the polyoxiranylalkanols according to formula (IIIa) and (IVa) are further polymerized or functionalized. By further polymerization, additional oxiranylalkanol monomers are branched off a main polyoxiranylalkanol chain. By functionalization, the groups —R—OH serve as crosslinking sites to a carboxyl-containing polymer included in the hydraulic fracturing fluid to cause gelation to facilitate gelation, or to stabilize or maintain a gel state of the hydraulic fracturing fluid. A carboxyl-containing polymer refers to a polymer that is produced from one or more monomers containing carboxyl groups or derivatives thereof, such as salts or esters of the carboxyl containing monomers. Examples of carboxyl-containing polymers may include, but are not limited to, acrylamide-based polymers such as acrylates and polyacrylamides (PAMs).

In one or more embodiments, oxiranylalkanol reacts with a nitrogen atom in the base polymer to form the oxiranylalkanol branch. The nitrogen atom which the oxiranylalkanol reacts with may be included in the base polymer as a primary or a secondary amine, such that the hyperbranched crosslinker includes a secondary amine bonded to an oxiranylalkanol branch, a tertiary amine bonded to one or two oxiranylalkanol branches, or combinations thereof. In one or more embodiments, a percentage ratio of secondary amines bonded to an oxiranylalkanol branch in the hyperbranched crosslinker, with respect to the total secondary amines included in the hyperbranched crosslinker is in a range of from about 5% to about 40%.

Oxiranylalkanol may be bonded to any of the nitrogen atom (that are not already tertiary amine prior to bonding) included in the base polymer to form the oxiranylalkanol branch. The nitrogen atom that the oxiranylalkanol branch is bonded to may be included in the linear or non-branched portion of the base polymer (0 branching generation portion), within any of the higher branching generation of the base polymer, such as branching generation of 2, 3, 4 and so on, or combinations thereof.

Amide-Containing Branch

In one or more embodiments, the hyperbranched crosslinker includes at least one amide-containing branch bonded to the base polymer. The amide-containing branch includes at least one monomer unit derived from an acid anhydride capable of forming an amide bond with a nitrogen atom included in the base polymer.

The acid anhydride included as a monomer unit in the amide-containing branch may be any suitable acid anhydride. The acid anhydride may contain 2 or more functional groups such that at least 2 reaction sites may be provided to react with —OH and/or —$NH_2$ groups included in, for example, the base polymer and/or carboxyl-containing polymer.

The acid anhydride may include cyclic acid anhydride. Examples of cyclic acid anhydride include, but are not limited to, maleic anhydride, phthalic anhydride, succinic anhydride, glutaric anhydride, adipic anhydride, glycolic anhydride, itaconic anhydride, citraconic anhydride, and dimethylmaleic anhydride. Maleic anhydride may be included as a low-cost acid anhydride.

In one or more embodiments, acid anhydride reacts with a nitrogen atom in the base polymer to form the amide-containing branch. The nitrogen atom which the acid anhydride reacts with may be included in the base polymer as a primary or a secondary amine group, such that the hyperbranched crosslinker includes a secondary amine bonded to an amide-containing branch, a tertiary amine bonded to one or two amide-containing branches, or combinations thereof. In one or more embodiments, a percentage ratio of secondary amines bonded to an amide-containing branch in the hyperbranched crosslinker, with respect to the total secondary amines included in the hyperbranched crosslinker, is in a range of from about 5% to about 40%.

Acid anhydride may be bonded to any of the nitrogen atoms (that are not already tertiary amine prior to bonding) included in the base polymer to form the amide-containing branch. The nitrogen atom that the amide-containing branch is bonded to may be included in the linear or non-branched portion of the base polymer (zero branching generation portion), a nitrogen atom within any of the higher generation branching of the base polymer, such as a branching generation of 2, 3, 4 and so on, or combinations thereof.

In the present disclosure, the "amide-containing branch" refers to a branch that includes a monomer unit derived from an acid anhydride and bonded to any of the nitrogen atom included in the base polymer, including a nitrogen atom included in the linear or non-branched portion of the base polymer (zero branching generation portion), and a nitrogen atom within any of the higher branching generation, such as a branching generation of 2, 3, 4 and so on. In case the amide-containing branch is bonded to a nitrogen atom in the non-branched portion of the base polymer (zero branching generation portion), the amide group would be formed between the nitrogen in the non-branched portion of the base polymer and the C═O group of the reacted acid anhydride. However, for the purpose of the present disclosure, the "amide-containing branch" would include such a bonding configuration.

In one or more embodiments, the hyperbranched crosslinker includes a hyperbranched crosslinker macromolecule. In the hyperbranched crosslinker macromolecule, a portion of the amide-containing branches included in a hyperbranched crosslinker unit ("first hyperbranched crosslinker unit") is bonded to a nitrogen atom contained in the base polymer of another hyperbranched crosslinker unit ("second hyperbranched crosslinker unit"). As shown in FIG. 1, C═C bond included in the amide-containing branch may react with an amino group included in the base polymer of another hyperbranched crosslinker unit (represented by "HN~" in FIG. 1) to form a larger molecule of the hyperbranched crosslinker.

It is understood that one amide-containing branch of the first hyperbranched crosslinker unit may bond to a nitrogen atom of a base polymer included in the second hyperbranched crosslinker unit, while another amide-containing branch of the first hyperbranched crosslinker unit may bond to a nitrogen atom of a base polymer included in the same hyperbranched crosslinker unit (i.e., second hyperbranched crosslinker unit) or yet another hyperbranched crosslinker molecule ("third hyperbranched crosslinker unit"). In other words, the hyperbranched crosslinker macromolecule may include, for example, 2 or more, 3 or more, or 4 or more, hyperbranched crosslinker units.

In one or more embodiments, the groups —OH of the amide-containing branch are further functionalized. By functionalization, the groups —OH serve as crosslinking sites to the carboxyl-containing polymer, such as an acrylamide-based polymer, of the hydraulic fracturing fluid to cause gelation, to facilitate gelation, or to stabilize or maintain a gel state of the hydraulic fracturing fluid.

In one or more embodiments, each of the amid-containing branches included in the hyperbranched crosslinker includes one monomer unit derived from acid anhydride. The amide-containing branches may include a monomer unit derived from the same type of acid anhydride, or may include a monomer unit derived from two or more types of acid anhydride.

In one or more embodiments, the amide-containing branch is degradable in an acid, a base, or combinations thereof, under an elevated temperature. The acid may be a weak acid or a strong acid, and the base may be a weak base or a strong base. The acidity of the acid used to degrade the amide-containing branch may be, for example, 1% HCl equivalent or higher. The alkalinity of the acid used to degrade the amide-containing branch may be, for example, 1% NaOH equivalent or higher. The degradation may occur due to hydrolysis of the amide bond present within the amide-containing branch. Such a degradation property allows the breakdown of the crosslinked polymer mixture formed by the hyperbranched crosslinker and a carboxyl-containing polymer, such as an acrylamide-based polymer, in hydraulic fracturing fluid applications. The degradation may reduce or eliminate the damage caused by the crosslinked polymer mixture, which may be in a gel form, lodged in the subterranean formation by allowing the crosslinked polymer mixture to disintegrate upon exposure to acid and/or base.

The amide-containing branch may be degradable under an elevated temperature, such as under a temperature of at least 80° C., with the presence of acid and/or base. In one more embodiments, the amide-containing branch may be degradable under a temperature in a range of from about 80° C. to about 150° C., such as in a range of from a lower limit selected from any one of 80, 90 and 100° C. to an upper limit selected from any one of 130, 140 and 150° C., where any lower limit may be paired with any upper limit.

Hyperbranched Crosslinker Structure and Properties

In one or more embodiments, the hyperbranched crosslinker has a molar ratio of oxiranylalkanol branch to amide-containing branch of about 1 or less, such as in a range from a lower limit selected from any one of 0.01, 0.1, and 0.2 to an upper limit selected from any one of 0.8, 0.9 and 1, where any lower limit may be paired with any upper limit. The entirety of primary and secondary amines in the base polymer may react with oxiranylalkanol and acid anhydride to become tertiary amines, or a portion of the primary and/or secondary amines in the base polymer may remain unreacted or partially reacted, and remain as a primary or secondary amine. The primary amines in the base polymer may react to become tertiary amines bonded to two oxiranylalkanol branches, two amide-containing branches, or one oxiranylalkanol branch and one amide-containing branch.

In one or more embodiments, each of the oxiranylalkanol branch has a structure expressed by formula (III) or formula (IV):

(III)

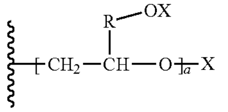

(IV)

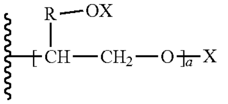

In formula (III) and formula (IV), R is $-(CH_2)_b-$, where b is an integer from 1 to 5. Subscript a, referring to a number of monomer units derived from oxiranylalkanol, may be from about 1 to about 100, such as in a range of from a lower limit of 1 to an upper limit selected from any one of 2, 3, 4, 5, 10, 20, 30, 40, 50 and 100, where the lower limit may be paired with any of the upper limit. The subscript a may be equal to 1. Each X is hydrogen, a crosslinking site to the carboxyl-containing polymer such as the acrylamide-based polymer, or an additional oxiranylalkanol branch according to formula (III) or formula (IV). At the terminal portion of the oxiranylalkanol branch according to formula (III) or formula (IV), group X of the moiety —R—OX of the oxiranylalkanol branch, may be hydrogen or a crosslinking site to the carboxyl-containing polymer.

Branching of the oxiranylalkanol occurs in case additional oxiranylalkanol branches are bonded to X in formula (III) or formula (IV) ("polyoxiranylalkanol (POA) branching"). A POA branch bonded directly to the main chain of the hyperbranched polyethyleneimine or directly to a polyethyleneimine branch represents a first generation of POA branching, a POA branch bonded to a first-generation POA branch represents a second generation of POA branching, a POA branch bonded to a second-generation POA branch represents a third generation of POA branching, and so forth. The hyperbranched crosslinker may include POA branches with a branching generation in a range of from 1 to 20, such as from a lower limit of 1, to an upper limit selected from any one of 2, 3, 4, 5, 10 and 20, where the lower limit may be paired with any of the upper limit. In or more embodiments, the POA branching may have a branching generation of 1. In the final generation of POA branching, group X of the moiety —R—OX of the polyoxiranylalkanol branch is hydrogen or a crosslinking site to the acrylamide-based polymer.

In one or more embodiments, each of the oxiranylalkanol branches included in the hyperbranched crosslinker is bonded to a nitrogen atom included in a portion of the base polymer with the branching generation in a range of from 0 to about 20, such as from a lower limit of 0, to an upper limit selected from any one of 2, 3, 4, 5, 10 and 20, where any lower limit may be paired with any upper limit. An oxiranylalkanol branch bonded to a nitrogen atom included in a portion of the base polymer with a branching generation of 0 means that the branch is bonded to a nitrogen atom included in the linear or non-branched portion of the base polymer, as previously described.

The hyperbranched crosslinker may have a weight-average molecular weight (Mw) in a range of from about 0.5 kDa to 1500 kDa.

A ratio of the weight-average molecular weight of the hyperbranched crosslinker to the weight-average molecular weight of the base polymer may be in a range of from about 1.01 to about 2, such as in a range of from a lower limit selected from any one of 1.01 and 1.2 to an upper limit selected from any one of 1.5 and 2, where any lower limit may be paired with any upper limit. Upon reacting the base polymer with the oxiranylalkanol and acid anhydride, the weight-average molecular weight of the original base polymer may increase by about 1% to about 100%, or may increase by a percent in a range of from a lower limit selected from any one of 1, 10, 20, 30 and 40 wt % to an upper limit selected from any one of 50, 60, 70, 80, 90 and 100%, where any lower limit may be paired with any upper limit. The amount of molecular-weight increase from the reaction, as well as the number of oxiranylalkanol branches and amide-containing branches included in the hyperbranched crosslinker may be tailored by choosing molar amounts of the oxiranylalkanol and acid anhydride relative to the number of primary and secondary amine nitrogen atoms in the base polymer.

Hydraulic Fracturing Fluid

In one aspect, embodiments enclosed herein relate to a hydraulic fracturing fluid. The hydraulic fracturing fluid includes a crosslinked polymer mixture formed by reacting a hyperbranched crosslinker and a carboxyl-containing polymer, and an aqueous fluid. The hydraulic fracturing fluid may include, optionally, one or more additives. The additives may be reactive or inert with respect to the hyperbranched crosslinker.

The hyperbranched crosslinker interacts with at least a portion of the carboxyl-containing polymer in solution with the aqueous fluid (also called a base fluid) to form the crosslinked polymer mixture having a three-dimensional polymer network, thereby increasing stability and viscosity of the hydraulic fracturing fluid. Increased viscosity in a hydraulic fracturing fluid leads to better suspension of the proppant in the fracturing fluid. In turn, proper suspension of the proppant holds the subterranean formation open to allow extraction of the gas or oil without any damage to the subterranean formation. The crosslinked polymer mixture may be in the form of a gel or thickened or viscosified liquid.

The hyperbranched crosslinker included in the hydraulic fracturing fluid may be the hyperbranched crosslinker as previously described. The amount of the hyperbranched crosslinker may be appropriately selected such that the hydraulic fracturing fluid includes the crosslinked polymer mixture in an amount as described in the subsequent section.

The acrylamide-based polymer may be a polyacrylamide polymer or copolymer. Examples of polyacrylamide polymers may include, but are not limited to, polyacrylamide homopolymer, a polyacrylamide copolymer, a polyacrylamide terpolymer, a polyacrylamide tetrapolymer, or combinations thereof. The polyacrylamide polymer, whether a copolymer, terpolymer, or tetrapolymer may include at least one monomer selected from the group consisting of acrylic acid, or other monomers containing carboxyl groups or their salts or esters such as acrylates, and combinations thereof. Examples of such acrylates include, without limitation, methyl acrylate, ethyl acrylate, n-propyl acrylate, isopropyl acrylate, n-butyl acrylate, isobutyl acrylate, tert-butyl acrylate, and n-octyl acrylate. The acrylamide-based polymer may include other monomers in addition to the carboxyl-containing monomer. Such other monomers may include, for example, acrylamide, methacrylamide, or N-substituted acrylamides. Further examples of said N-substituted acrylamides include, among others, N-methyl acrylamide, N-propyl acrylamide, N-butyl acrylamide, N,N-dimethyl acrylamide, and N-methyl-N-sec-butyl acrylamide.

The amount of the carboxyl-containing polymer may be appropriately selected such that the hydraulic fracturing fluid includes the crosslinked polymer mixture in an amount as described in the subsequent section.

The aqueous fluid included in the hydraulic fracturing fluid may be any water-based medium suitable for hydraulic fracturing operations, the specifications and requirements of which would be understood to a person having ordinary skill in the art. Examples of aqueous fluids may include, but are not limited to, water or a solution containing both water and one or more organic or inorganic compounds dissolved in the water or otherwise completely miscible with the water. The aqueous fluid may contain water from any source, including freshwater, well water, filtered water, distilled water, sea water, salt water, produced water, formation brine, other type of water, or combinations of waters. The aqueous fluid may contain brine, including natural and synthetic brine. The aqueous fluid may include water containing water-soluble organic compounds, such as alcohols, organic acids, amines, aldehydes, ketones, esters, or other polar organic compounds for example, or salts dissolved in the water.

The aqueous phase may include salts, water-soluble organic compounds, or both, as impurities dissolved in the water. In one or more embodiments, the aqueous phase includes salts, water-soluble organic compounds, or both salts and water-soluble organic compounds to modify at least one property of the aqueous phase, such as the density of the aqueous phase. In one or more embodiments, increasing the amount of salt, water-soluble organic compounds, or both salt and water-soluble organic compounds in the aqueous phase may increase the density of the hydraulic fracturing fluid. In some embodiments, salts that may be present in the aqueous phase may include metal salts such as sodium salts, calcium salts, cesium salts, zinc salts, aluminum salts, magnesium salts, potassium salts, strontium salts, silicates, lithium salts, or combinations of these, for example. The metal salts may be in the form of chlorides, bromides, carbonates, hydroxides, iodides, chlorates, bromates, formates, nitrates, sulfates, phosphates, oxides, fluorides or combinations of these, for example.

The hydraulic fracturing fluid may include the crosslinked polymer mixture, formed by reacting the hyperbranched crosslinker with the carboxyl-containing polymer, in an amount of from about 1 pound to about 100 pounds per thousand gallons of hydraulic fracturing fluid. In one or more embodiments, the hydraulic fracturing fluid may include the crosslinked polymer mixture in an amount from a lower limit selected from any one of 1, 15 and 20 pounds per thousand gallons of hydraulic fracturing fluid, to an upper limit selected from any one of 45, 50 and 100 pounds per thousand gallons of hydraulic fracturing fluid, where any lower limit may be paired with any upper limit. It should be understood that the unit of pounds per thousand gallons (pptg) is customary and noted that 1.00 pptg is equivalent to approximately 0.120 grams per liter (g/L) or 120 grams per 1000 liters (g/1000 L).

In one or more embodiments, the hydraulic fracturing fluid further includes one or more additional ingredients or additives. Examples of such additives include, without limitation, clay-based components, proppants. The optional clay-based component may include one or more components selected from lime (CaO), $CaCO_3$, bentonite, montmorillonite clay, barium sulfate (barite), hematite ($Fe_2O_3$), mullite ($3Al_2O_3 \cdot 2SiO_2$ or $2Al_2O_3 \cdot SiO_2$), kaolin, ($Al_2Si_2O_5(OH)_4$ or kaolinite), alumina ($Al_2O_3$, or aluminum oxide), silicon carbide, tungsten carbide, or combinations thereof. Proppants within the hydraulic fracturing fluid may aid in treating subsurface fractures, to prop open and keep open the fracture. The hydraulic fracturing fluid in the subsurface fracture may comprise proppants suspended in the hydraulic fracturing fluid. In one or more embodiments, the proppants are distributed throughout the hydraulic fracturing fluid. Proper suspension of the proppant holds a subterranean formation open to allow extraction of the gas or oil without any damage to the subterranean formation.

The hydraulic fracturing fluid may further include polymers, in addition to the crosslinked polymer mixture. Such polymers may be synthetic polymers or natural polymers such as guar gum, xanthan gums, and may or may not include carboxyl groups.

The hydraulic fracturing fluid may optionally include additives that alter the salt concentration of the crosslinked polymer mixture. In one or more embodiments, brine solution may be added, such as KCl brine or $CaCl_2$) brine. Optionally, the hydraulic fracturing fluid may include additional components such as buffers, antioxidants, biocides, clay stabilizers, diverting agents, fluid loss additives, friction reducers, iron controllers, or gel stabilizers. The fracturing fluid may further include a surfactant, which may be used to lower the surface tension of the fracturing fluid. Various surfactants are contemplated, for example, anionic surfactants, cationic surfactants, amphoteric surfactants, zwitterionic surfactants, or combinations thereof.

Optionally, the hydraulic fracturing fluid may also include a breaker to degrade the crosslinked polymer mixture. The breaker is used to "break" or reduce the viscosity of the fracturing fluid so that the fracturing fluid may be easily recovered from the fracture during clean up. In one or more embodiments, the breaker may be an acid, an oxidizer, an enzyme breaker, a chelating agent, or a combination thereof. Examples of the breakers may include, but are not limited to, sodium bromate, potassium bromate, sodium persulfate, ammonium persulfate, potassium persulfate, and various peroxides. Additionally, an encapsulant may be used to control or delay the release of the breaker encapsulated or disposed therein. In one or more embodiments, the breaker may include a combination of encapsulated and unencapsulated breaker. For example, the breaker may include a combination of sodium bromate and encapsulated sodium bromate.

Method for Producing Hyperbranched Crosslinker

In one aspect, embodiments enclosed herein relate to a method for producing a hyperbranched crosslinker. The method includes introducing an acid anhydride to a base polymer comprising hyperbranched polyethyleneimine, and reacting the base polymer with the acid anhydride to produce an acid anhydride-modified base polymer including the base polymer and at least one amide-containing branch bonded to the base polymer. The method further includes introducing oxiranylalkanol to the acid anhydride-modified base polymer, and reacting the acid anhydride-modified base polymer with oxiranylalkanol to produce the hyperbranched crosslinker. The hyperbranched crosslinker may be any of the hyperbranched crosslinker as previously described, and may include at least one oxiranylalkanol branch including at least one oxiranylalkanol monomer unit derived from oxiranylalkanol and bonded to the base polymer, and at least one amide-containing branch including at least one monomer unit derived from an acid anhydride and bonded to the base polymer.

In one or more embodiments, the method further includes separating unreacted acid anhydride from the acid anhydride-modified base polymer. The separation of unreacted acid anhydride may be conducted before oxiranylalkanol is introduced to the acid anhydride-modified base polymer, and the acid anhydride-modified base polymer is reacted with oxiranylalkanol. The separation may be conducted, for example, by a dialysis process. The dialysis process may be conducted, for example, by placing the mixture including the acid anhydride-modified base polymer and the unreacted acid anhydride in a dialysis bag, and placing the dialysis bag in a water bath to allow the unreacted acid anhydride to flow out of the dialysis bag. The dialysis bag may include a selectively-permeable membrane which allows smaller molecules, such as unreacted acid anhydride, to pass through, while preventing larger molecules, such as the anhydride-modified base polymer, to pass through.

In one or more embodiments, at least a portion of the acid anhydride reacts with a nitrogen atom of a primary amine included in the base polymer to produce a secondary amine, which may remain as a secondary amine in the hyperbranched crosslinker or may further react to become a tertiary amine. The acid anhydride may also react with a secondary amine included in the base polymer to produce a tertiary amine.

In one or more embodiments, at least a portion of the oxiranylalkanol reacts with a nitrogen atom of a primary amine included in the base polymer to produce a secondary amine, which may remain as a secondary amine in the hyperbranched crosslinker or may further react to become a tertiary amine. The oxiranylalkanol may also react with a secondary amine included in the base polymer to produce a tertiary amine.

The reacting of the base polymer with acid anhydride (first reaction step) may be conducted at a temperature in a range of from about 1° C. to about 80° C. for a duration in a range of at least 5 hours. The reaction of the base polymer with acid anhydride may be conducted at a temperature in a range of from a lower limit selected from any one of 1, 5, 10, 20 and 30° C. to an upper limit selected from any one of 20, 30, 40, 50, 60, 70 and 80° C., where any lower limit may be paired with any mathematically-compatible upper limit. The reaction of the base polymer with acid anhydride may be conducted for a duration in a range of from about 5 hours to about 20 hours, such as in a range of from a lower limit selected from any one of 5, and 10 hours, to an upper limit selected from any one of 15 and 20 hours, where any lower limit may be paired with any upper limit. The reacting may be conducted, for example, by dissolving the base polymer in a solvent, such as water or N-methyl-2-pyrrolidone, to produce a base polymer solution, adding the acid anhydride to the base polymer solution, and mixing the base polymer solution under the temperature and for a duration as previously described.

In one or more embodiments, the base polymer is cooled prior to the introduction of acid anhydride to the base polymer and reacting of the based polymer with acid anhydride, in order to mitigate the heat generated by the reaction between the base polymer and acid anhydride. The base polymer may be cooled with a method available in the art, such as by using an ice bath.

The dissolving of the base polymer in the solvent may be conducted, for example, at a temperature in a range of from about 1° C. to about 80° C., such as in a range of from a lower limit selected from any one of 1, 5, 10 and 20° C., to an upper limit selected from any one of 20, 30, 40, 50, 60, 70 and 80° C., where any lower limit may be paired with any mathematically-compatible upper limit. The dissolving of the base polymer in the solvent may be conducted, for example, for a duration in a range of from about 30 minutes to 5 hours, such as for 1 hour or 2 hours.

The amount of base polymer and acid anhydride added in the first reaction step may be adjusted based on the requirements of each application. In one or more embodiments, a molar ratio of the base polymer to acid anhydride may be in a range of from about 1 to about 5, such as in a range of from a lower limit selected form any one of 1 and 2, to an upper limit selected from any one of 4 and 5, where any lower limit may be paired with any upper limit.

The reaction of the acid anhydride-modified base polymer with oxiranylalkanol (second reaction step) may be conducted at a temperature in a range of from about 20° C. to about 80° C. for a duration in a range of from about 1 day to 10 days. In one or more embodiments, the reaction of the acid anhydride-modified base polymer with oxiranylalkanol is conducted at a temperature in a range of from a lower limit selected from any one of 20, 30 and 40° C. to an upper limit selected from any one of 60, 70 and 80° C., where any lower limit may be paired with any upper limit. In one or more embodiments, the reaction of the acid anhydride-modified base polymer with oxiranylalkanol is conducted for a duration in a range of from a lower limit selected from any one of 1, 2 and 3 days to an upper limit selected from any one of 8, 9 and 10 days, where any lower limit may be paired with any upper limit. The reacting step may be conducted, for example, by adding oxiranylalkanol to the acid anhydride-modified base polymer, which may be in a solution form (e.g., dissolved in a solvent such as water or NMP), to form a modified base polymer solution, and mixing the modified base polymer solution under the temperature and for a duration as previously described.

The amount of acid anhydride-modified base polymer and oxiranylalkanol added in the second reaction step may be adjusted based on the requirements of each application. In one or more embodiments, a molar ratio of the acid anhydride-modified base polymer to oxiranylalkanol may be in a range of from about 0.1 to about 3, such as in a range of from a lower limit selected from any one of 0.1, 0.2 and 0.3 to an upper limit selected from any one of 2, 2.5 and 3, where any lower limit may be paired with any upper limit.

In one or more embodiments, the method further includes reacting the acid anhydride-modified base polymer with water to include an amine group within the amide-containing branch. The reaction of acid anhydride-modified base polymer with water may be conducted by introducing water to the acid anhydride-modified base polymer, and may be conducted prior to the reaction of the acid anhydride-modified base polymer with oxiranylalkanol.

The reaction of acid anhydride-modified base polymer with water may be conducted under room temperature or an elevated temperature, such as at a temperature in a range of from about 20° C. to 80° C., for example, at a temperature in a range from a lower limit selected from any one of 20, 30 and 40° C., to an upper limit selected from any one of 60, 70 and 80° C., where any lower limit may be paired with any upper limit. The reaction of acid anhydride-modified base polymer with water may be conducted at a temperature of about 50° C.

The reaction of the acid anhydride-modified base polymer with water may be conducted for a duration of about 3 days to about 10 days, such as a duration in a range of from a lower limit selected from any one of 3, 4 and 5 days, to an upper limit selected from any one 8, 9 and 10 days, where any lower limit may be paired with any upper limit. The reaction of acid anhydride-modified base polymer with water may be conducted for about 7 days.

Method for Producing Hydraulic Fracturing Fluid

In one aspect, embodiments enclosed herein relate to a method for producing a hydraulic fracturing fluid. The method includes combining an aqueous fluid and a carboxyl-containing polymer to obtain a stock solution, adjusting the pH of the stock solution to a range of about 6 to about 10, adding a hyperbranched crosslinker to the stock solution, and agitating the stock solution to allow a crosslinked polymer mixture to form to produce the hydraulic fracturing fluid. The stock solution having a pH of greater than 10 may cause instability of ether bonds included within the hyperbranched crosslinker and/or ether bonds bonding the hyperbranched crosslinker and the carboxyl-containing polymer.

The aqueous fluid, carboxyl-containing polymer and hyperbranched crosslinker may be the aqueous fluid, carboxyl-containing polymer and hyperbranched crosslinker as previously described. The stock solution may further include any of the additives or components included in the hydraulic fracturing fluid as previously described.

The combining, adding and agitating steps may be conducted by a suitable method and equipment known in the art. The adjustment of pH may be conducted, for example, by adding a pH adjuster, or pH increaser, as necessary.

Method for Treating Subterranean Formation

In one aspect, embodiments enclosed herein relate to a method for treating subterranean formation. The method includes contacting the subterranean formation with a hydraulic fracturing fluid and propagating at least one subterranean fracture in the subterranean formation with the hydraulic fracturing fluid. The hydraulic fracturing fluid may be any hydraulic fracturing fluid as previously described.

In one or more embodiments, contacting the subterranean formation may include injecting the hydraulic fracturing fluid into the subterranean formation. In one or more embodiments, contacting the subterranean formation may further include drilling into the subterranean formation; and injecting the hydraulic fracturing fluid into the at least one subterranean fracture in the subterranean formation. In embodiments, the subterranean formation may include rock, shale, or coal.

EXAMPLES

The following Examples are provided for the purpose of further illustrating the present inventions and are in no way intended to be limiting.

Example 1 (EX 1)

An exemplary hyperbranched crosslinker was produced by first adding 10 g (0.233 mol) of hyperbranched polyethyleneimine (PEI) having a weight-average molecular weight (Mw) of 0.8 kDa and 40 mL (0.283 mol) of triethylamine into a 250 mL round-bottom flask, followed by 100 mL of N-methyl-2-pyrrolidone. The mixture was mixed in an ice bath for 1 hour. 6.8 g (0.069 mol) of maleic anhydride was then added to mixture gradually, and the mixture was mixed overnight until the temperature of the mixture reached room temperature to produce a reaction mixture including anhydride-modified hyperbranched PEI. 60 mL of distilled water was then added to the reaction mixture, and the reaction mixture was mixed at 50° C. for 1 week. 30 mL (0.45 mol) of glycidol was then added to the reaction mixture and further mixed at 50° C. for 4 days to produce a crude mixture including the hyperbranched crosslinker. The crude mixture was transferred into a beaker cooled to room temperature. KOH solution was then added to adjust the pH of the crude mixture to approximately 10. The crude mixture was purified by carrying out dialysis in water using dialysis tubing with a molecular weight cut-off of 14 kDa to isolate the hyperbranched crosslinker, a highly viscous polymer.

Example 2 (EX 2)

An exemplary hyperbranched crosslinker was produced as described in EXAMPLE 1 except that 33 g of hyperbranched PEI with $M_w$ of 25 kDa, 3 ml of maleic anhydride and 20 ml of glycidol were used.

Example 3 (EX 3)

An exemplary hyperbranched crosslinker was produced as described in EXAMPLE 2 except that 6 ml of maleic anhydride was used.

Figure 2:
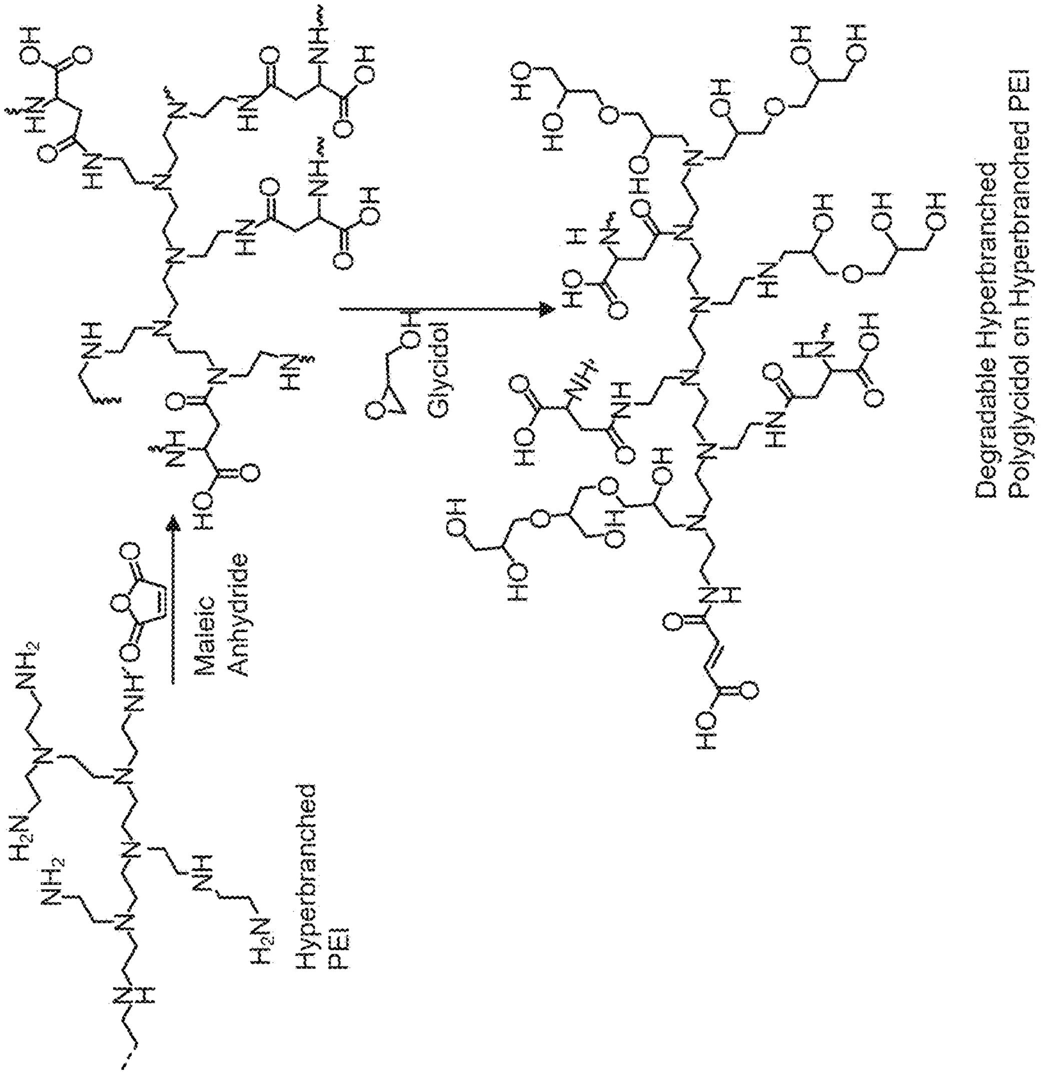
FIG. 2 is a reaction scheme for the hyperbranched crosslinker production according to one or more embodiments.

FIG. 2 is a diagram illustrating the reaction scheme included in the production of the exemplary hyperbranched crosslinkers of EXAMPLES 1-3.

Comparative Example 1 (CE 1)

An comparative crosslinker was produced as described in EXAMPLE 1 except that no glycidol was added.

The amount of components used and the $M_w$ of hyperbranched PEI are summarized in Table 1

TABLE 1

| Samples | Molecular weight of hyper-branched PEI used (Mw) | Mass of Hyper-branched PEI (g) | Mass of Maleic Anhydride (mL) | Volume of Glycidol (mL) |
|---|---|---|---|---|
| EX 1 | 800 | 10 | 6.8 | 30 |
| EX 2 | 25000 | 33 | 3 | 20 |
| EX 3 | 25000 | 33 | 6 | 20 |
| CE 1 | 800 | 10 | 6.8 | 0 |

Example 4 (EX 4)

Exemplary hydraulic fracturing fluids were produced by mixing appropriate amounts of EXAMPLE 1 and deionized water to produce a 12 wt % hyperbranched crosslinker aqueous solution and then mixing 0.5 ml of the hyperbranched crosslinker aqueous solution with an appropriate amount of 80 parts per thousand gallon (pptg) polyacrylamide solution in a test tube to produce mixtures with 25 gallons per thousand (gpt) and 40 gpt polymer loading (amount of polyacrylamide). Additional mixtures were produced as above except that in each mixture having 25 gpt and 40 gpt polymer loading, an appropriate amount of NaOH buffer was added to adjust the pH of the mixture to approximately 10. The mixtures were then observed for gel formation at 20° C. and 80° C.

Example 5 (EX 5)

An exemplary hydraulic fracturing fluid was produced as described in EXAMPLE 4 except that the hyperbranched crosslinker of EXAMPLE 1 was replaced with EXAMPLE 2.

Example 6 (EX 6)

An exemplary hydraulic fracturing fluid was produced as described in EXAMPLE 4 except that the hyperbranched crosslinker of EXAMPLE 1 was replaced with EXAMPLE 3.

Comparative Example 2 (CE 2)

An comparative hydraulic fracturing fluid was produced as described in EXAMPLE 4 except that the hyperbranched crosslinker of EXAMPLE 1 was replaced with a crosslinker of COMPARATIVE EXAMPLE 1.

The results of gel formation testing are provided in Table 2:

TABLE 2

| | | Polymer Loading | | | |
|---|---|---|---|---|---|
| | | 40 gpt | | 25 gpt | |
| Temperature | Samples | No buffer | NaOH | No buffer | NaOH |
| 20° C. | EX 4 | Y | Y | YX | YX |
| | EX 5 | YX | Y | YX | YX |
| | EX 6 | YX | YX | YX | YX |
| | CE 2 | X | X | X | X |
| 80° C. | EX 4 | Y | Y | X | X |
| | EX 5 | YX | YX | YX | YX |
| | EX 6 | YX | YX | YX | YX |
| | CE 2 | YX | YX | X | X |

In Table 2, "X" represents no gel formation or viscosification (thickening of liquid), "YX" represents viscosification, and "Y" represents gelation.

As shown in Table 2, EXAMPLE 4 at a polymer loading of 40 gpt gelled at both 20 and 80° C., with and without the buffer. EXAMPLE 5 at a polymer loading 40 gpt also gelled at 20° C., with the presence of the buffer.

COMPARATIVE EXAMPLE 2 showed no gelling or viscosification at 20° C. for both polymer loading of 24 and 40 gpt, with or without the buffer.

EXAMPLE 4 and COMPARATIVE EXAMPLE 2 showed no gelling or viscosification at 80° C. for polymer loading of 25 gpt, with or without the buffer.

The remainder of the tested samples showed viscosification, as shown in Table 2.

The hyperbranched crosslinkers of EXAMPLES 1-3 had almost complete yield after the dialysis.

NMR Analysis

NMR analysis was conducted on the hyperbranched crosslinker of EXAMPLE 1. The NMR spectra showed $^1$H-NMR peaks [$D_2O$] at 2.4-3.2 (m, $—CH_2—CH_2N(CH_2—CH_2—)_2$, $—CH_2—CH_2NH_2$, $—CH_2—CH_2NH(CH_2—CH_2—)$ and $—C(C{=}O)—CH_2—CH(NH—)—C(C{=}O)—OH$) which are due to PEI and maleic anhydride moiety, 3.4-3.80 (m, $—CH_2$) and 3.9-4.2 ($—CH—$) which are due to polyglycidol, and 5.9-6.6 (d, $—C(C{=}O)—CH{=}CH—C(C{=}O)—OH$) which are due to maleic anhydride moiety.

Rheology Testing

The rheological characteristics of EXAMPLES 4-6 (samples with the polymer loading of 40 gpt and which include the buffer) were studied using Chandler 5550 HPHT Rotational Viscometer. A standard ISO13503-1 testing schedule was followed by measuring the viscosity at 100 $s^{-1}$, 75 $s^{-1}$, 50 $s^{-1}$, and 25 $s^{-1}$ every 15 minutes after initial heat-up at 100 $s^{-1}$ for 20 minutes. The testing was conducted at 65° F. and 200° F. The rheology data is provided in FIGS. 3 and 4. The ISO13503-1 protocol is hereby incorporated herein by reference in its entirety.

Figure 3:
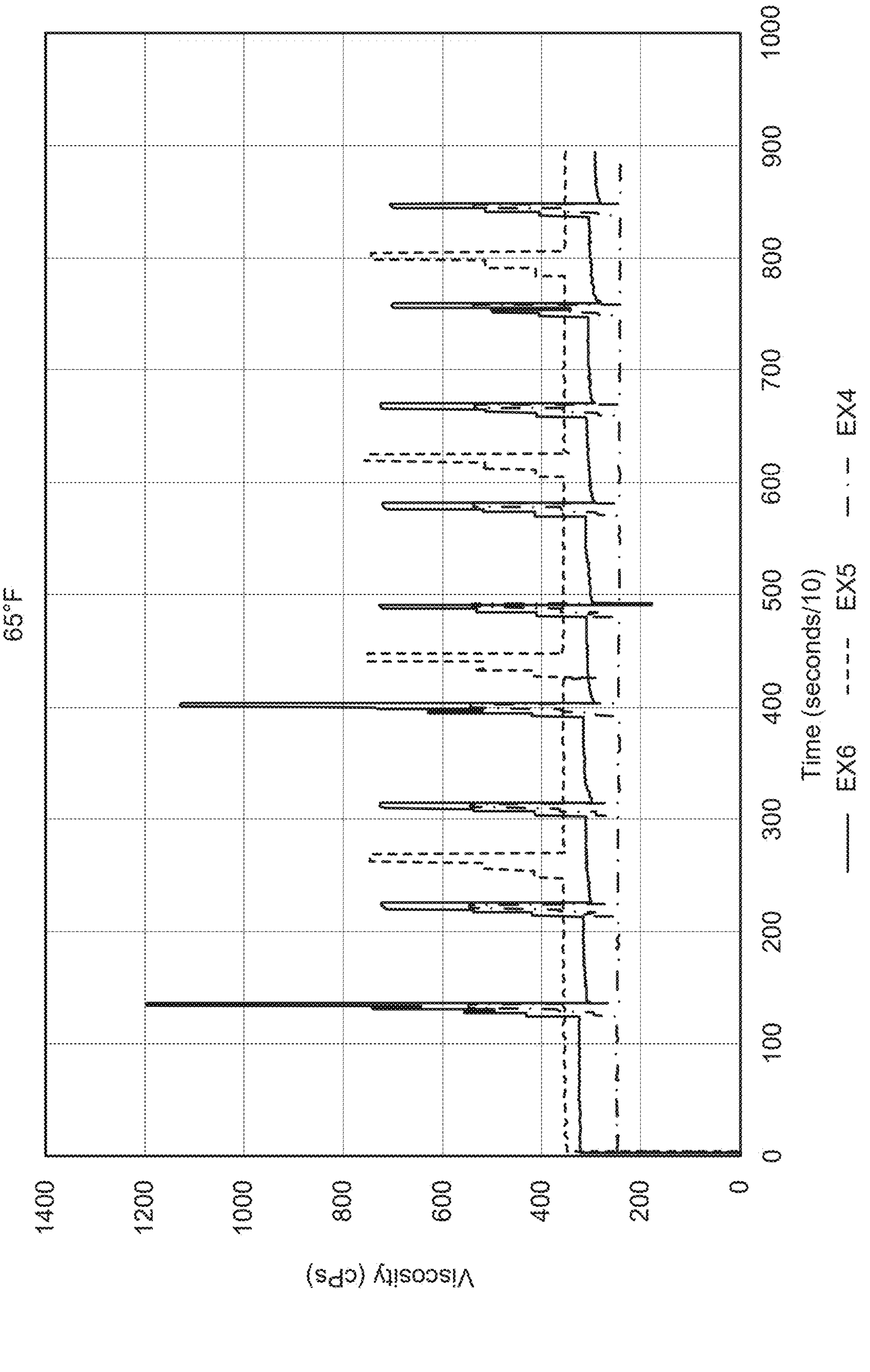
FIG. 3 is a time vs. viscosity plot of exemplary hydraulic fracturing fluid EXAMPLES 4-6 according to one or more embodiments.
Figure 4:
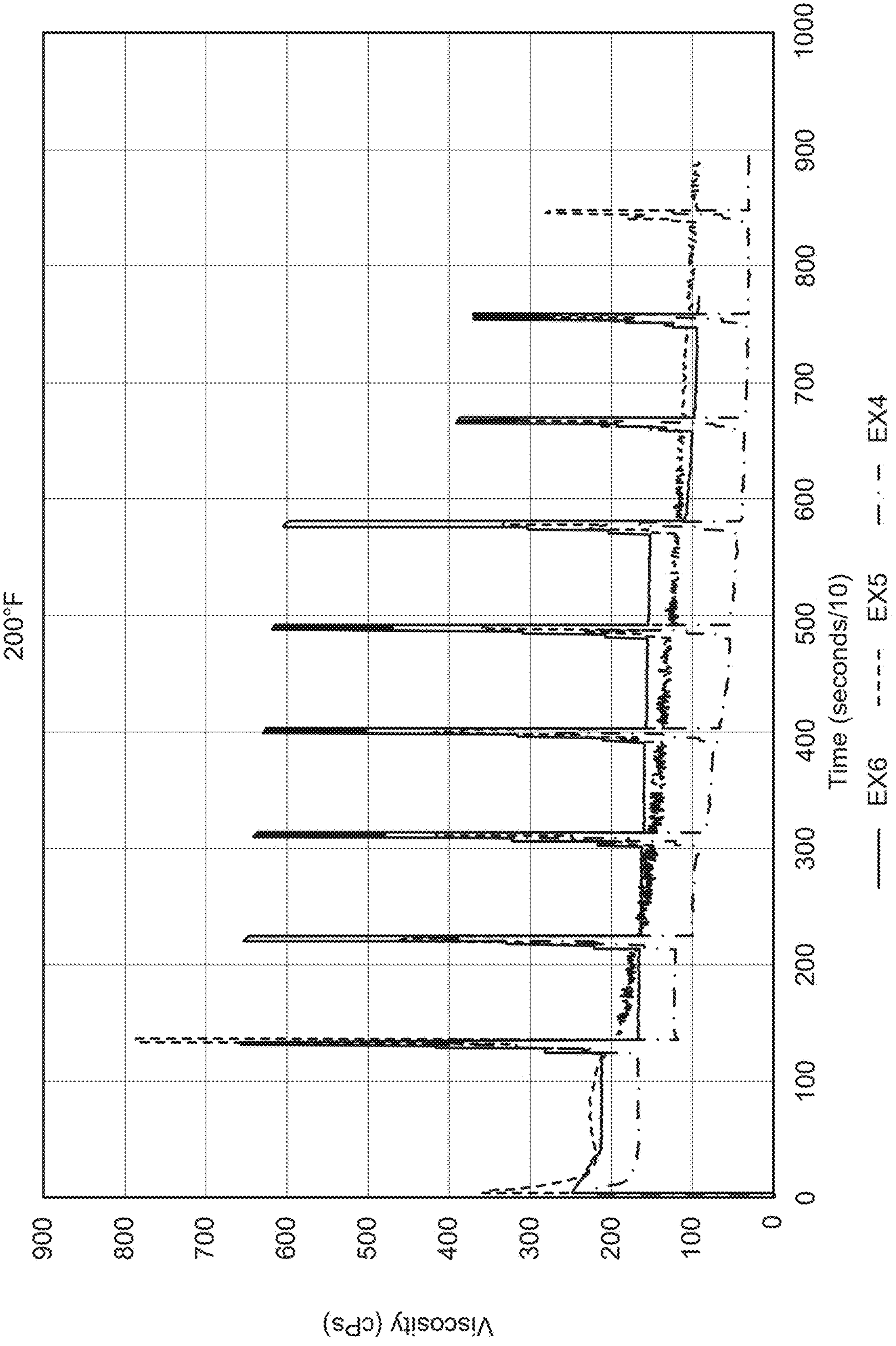
FIG. 4 is a time vs. viscosity plot of exemplary hydraulic fracturing fluid EXAMPLES 4-6 according to one or more embodiments.

FIGS. 3 and 4 show that the exemplary hydraulic fracture fluid of EXAMPLES 4-6 has stable rheological properties throughout the test under all tested shear rates. At 200° F., EXAMPLES 5-6 remained sufficiently stable throughout the test, indicating their suitability for the field applications.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

What is claimed is:

1. A hyperbranched crosslinker, comprising:

a base polymer comprising a hyperbranched polyethyleneimine;

at least one oxiranylalkanol branch comprising at least one oxiranylalkanol monomer unit derived from oxiranylalkanol and bonded to the base polymer; and at least one amide-containing branch comprising a monomer unit derived from an acid anhydride and bonded to the base polymer.

2. The hyperbranched crosslinker of claim 1, wherein the acid anhydride comprises a cyclic acid anhydride.

3. The hyperbranched crosslinker of claim 2, wherein the cyclic acid anhydride comprises maleic anhydride.

4. The hyperbranched crosslinker of claim 1, wherein the at least one amide-containing branch comprises at least two amide-containing branches, and the at least two amide-containing branches comprise the monomer unit derived from two or more types of acid anhydride.

5. The hyperbranched crosslinker of claim 1, wherein the oxiranylalkanol comprises glycidol.

6. The hyperbranched crosslinker of claim 1, wherein a weight-average molecular weight of the base polymer is in a range of from 0.5 kDa to 1000 kDa.

7. The hyperbranched crosslinker of claim 1, wherein:

the at least one oxiranylalkanol branch:

is bonded to a nitrogen atom of the base polymer, has a number of the oxiranylalkanol monomer units in a range of from 1 to 100, and has a branching generation in a range of from 1 to 20, and the at least one amide-containing branch is bonded to a nitrogen atom of the base polymer.

8. The hyperbranched crosslinker of claim 7, wherein the hyperbranched crosslinker comprises a plurality of secondary amines bonded to an oxiranylalkanol branch, an amide-containing branch, or combinations thereof.

9. The hyperbranched crosslinker of claim 1, further comprising a hyperbranched crosslinker macromolecule comprising at least 2 hyperbranched crosslinker molecular units.

10. The hyperbranched crosslinker of claim 1, wherein a molar ratio of the oxiranylalkanol branch to the amide-containing branch is 1 or less.

11. The hyperbranched crosslinker of claim 1, wherein the amide-containing branch is degradable in an acid, a base or combinations thereof.

12. A hydraulic fracturing fluid comprising:

a crosslinked polymer mixture formed by reacting:

the hyperbranched crosslinker of claim 1; and a carboxyl-containing polymer; and an aqueous fluid.

13. The hydraulic fracturing fluid of claim 12, wherein the carboxyl-containing polymer comprises an acrylamide-based polymer comprising at least one selected from the group consisting of a polyacrylamide, a polyacrylamide copolymer, a polyacrylamide terpolymer, a polyacrylamide tetrapolymer, and combinations thereof.

14. The hydraulic fracturing fluid of claim 12, wherein the crosslinked polymer mixture is comprised in the hydraulic fracturing fluid in an amount of from 1 pound to 100 pounds per thousand gallons of the hydraulic fracturing fluid.

15. A method for treating a subterranean formation, the method comprising:

contacting the subterranean formation with the hydraulic fracturing fluid according to claim 12; and propagating at least one subterranean fracture in the subterranean formation with the hydraulic fracturing fluid.

16. A method for producing a hydraulic fracturing fluid, the method comprising:

combining an aqueous fluid and a carboxyl-containing polymer to obtain a stock solution;

adjusting a pH of the stock solution to a range of from 6 to 10;

adding the hyperbranched crosslinker of claim 1 to the stock solution; and agitating the stock solution to allow a crosslinked polymer mixture to form to produce the hydraulic fracturing fluid.

17. A method for producing a hyperbranched crosslinker, comprising:

reacting a base polymer comprising hyperbranched polyethyleneimine with an acid anhydride to produce an acid anhydride-modified base polymer comprising the base polymer and at least one amide-containing branch, and reacting the acid anhydride-modified base polymer with oxiranylalkanol to produce the hyperbranched crosslinker comprising:

the base polymer comprising the hyperbranched polyethyleneimine, at least one oxiranylalkanol branch comprising at least one oxiranylalkanol monomer unit derived from oxiranylalkanol and bonded to the base polymer, and at least one amide-containing branch comprising a monomer unit derived from the acid anhydride and bonded to the base polymer.

18. The method of claim 17, further comprising separating unreacted acid anhydride from the acid anhydride-modified base polymer.

19. The method of claim 17, wherein:

the reacting the base polymer and the acid anhydride is conducted under a temperature in a range of from 1° C. to 80° C. for a duration of 5 hours to 20 hours, and the reacting the acid anhydride-modified base polymer and oxiranylalkanol is conducted under a temperature in a range of from 20° C. to 80° C. for a duration of 1 day to 10 days.

20. The method of claim 17, wherein the acid anhydride is maleic anhydride and the oxiranylalkanol is glycidol.

* * * * *